United States Patent [19]

Nick

[11] 3,786,418

[45] Jan. 15, 1974

[54] MULTI-TERMINAL DIGITAL SIGNAL COMMUNICATION APPARATUS

[75] Inventor: Howard H. Nick, Poughkeepsie, N.Y.

[73] Assignee: International Business Machines Corporation, Armonk, N.Y.

[22] Filed: Dec. 13, 1972

[21] Appl. No.: 314,894

[52] U.S. Cl. ........... 340/147 R, 178/68, 179/15 AL

[51] Int. Cl. ............................................ H04b 1/58

[58] Field of Search ............ 340/170, 147 R, 147 C; 178/58, 68, 69.5, 70; 179/15 BD; 333/18, 24

[56] References Cited

UNITED STATES PATENTS

| | | | |
|---|---|---|---|
| 3,516,065 | 6/1970 | Bolt et al. | 340/170 |
| 3,601,543 | 8/1971 | Maniere et al. | 178/69.5 R |
| 3,619,504 | 11/1971 | Deveer et al. | 178/68 |
| 3,737,585 | 6/1973 | Ghosh | 333/18 |
| 3,742,452 | 6/1973 | Audretsch, Jr. | 340/147 R |

*Primary Examiner*—Donald J. Yusko
*Attorney*—Harold H. Sweeney, Jr.

[57] ABSTRACT

A multi-terminal digital signal communication apparatus is provided which includes a continuous medium for conveying signals such as a transmission line. At least one signal sending section is provided for generating and propagating signals along the medium. A first directional coupler is provided associated with the transmission line for obtaining branch signals without interrupting the conveyance of the signals along the transmission line. The branch signals are amplified and recoupled to the main transmission line by a second directional coupler. These signals are propagated in the direction of conveyance of the signals along the medium and are superimposed on the signals giving rise to the branch signals. An output signal to the terminal may be obtained through a directional coupler in response to the amplified branch signal.

11 Claims, 5 Drawing Figures

MULTI-TERMINAL DIGITAL SIGNAL COMMUNICATION APPARATUS

This invention relates to a multi-terminal digital signal communication system, and more particularly, to a communication system in which the transmission medium is never interrupted and which can be as long as desired.

In data handling systems, a main data transmission line having a number of input/output terminals connected thereto have become known as transmission or communication loops. At these various terminals, information can be extracted from or added to the main transmission line. This can be accomplished by directional couplers which are capable of coupling high speed pulses to and from transmission lines with respect to stub lines leading to and from various peripheral devices. U.S. Pat. No. 3,516,065, filed Jan. 13, 1967, disclosed a system for transmitting digital data between a plurality of data processing devices using stripline directional couplers. The use of the directional coupler in this system eliminates the stub length limitations and allows any stub lines connecting individual devices to the transmission line to be limited in length only by the degradation of a signal passed along the line. Usually each terminal connected to the transmission line includes a controller which interfaces the transmission line and the terminal or input/output attachment. The number of terminals and the length of the transmission line are limited by normal signal attenuation. This limitation is overcome by introducing repeaters or amplifiers as needed along the transmission line. However, the repeaters detract somewhat from the inherent advantage of using directional couplers for extracting information from or adding information to the transmission line. That is, the repeaters physically interrupt the transmission line, thus affecting its reliability.

Accordingly, it is the main object of the present invention to provide a multi-terminal digital signal communication apparatus in which the length of the transmission line is practically unlimited and can be continuous.

It is a further object of the present invention to provide a multi-terminal digital signal communication apparatus in which the signal is amplified at each terminal without affecting the continuity of the transmission line.

It is further object of the present invention to provide a multi-terminal digital signal communication apparatus in which the continuity of the transmission system and, consequently, the reliability is maintained.

It is another object of the present invention to provide a multi-terminal digital signal communication apparatus in which the controller, the input/output attachment and the transmission line are afforded significant electrical isolation from one another.

Briefly, a multi-terminal communication apparatus is provided which includes a continuous medium for conveying signals and includes at least one signal sending means for generating and propagating signals along the medium. Branch signals are obtained at each terminal through electromagnetic coupling from the signals propagating along said medium without interrupting the conveyance of the signals along the medium. These branch signals are amplified and returned to the transmission medium by coupling so that the signals are propagating along the transmission medium in the direction of conveyance of the signals which gave rise to the branch signals and superimposed thereon.

The foregoing and other objects, features and advantages of the invention will be apparent from the following more particular description of an embodiment of the invention as illustrated in the accompanying drawings.

Figure 1:
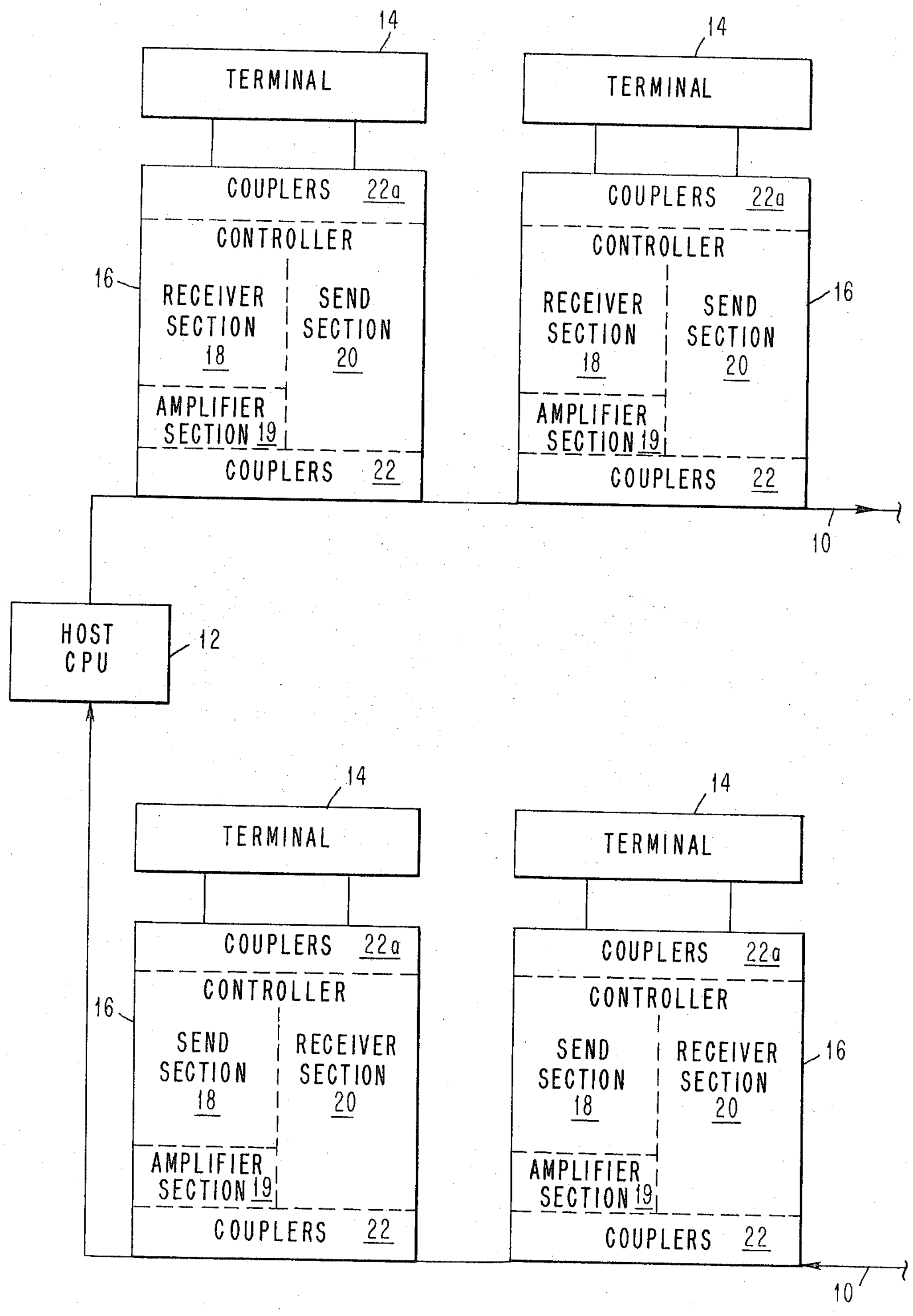
FIG. 1 is a schematic diagram showing the communication loop having a number of terminals located thereon.

The control loop or transmission line 10 shown in FIG. 1 generally consists of a central processing unit or host 12 which sends out information signals along the transmission line 10 to various input/output attachments shown as terminals 14. These information signals are obtained from the line by a controller 16 which is essentially an interface between the transmission line 10 and the input/output attachment or terminal 14. The controller 16 consists of a receiver section 18 fr receiving the information signals from the transmission line 10. The receiver section 18 includes an amplifier section 19 for amplifying the received signal before sending it to the terminal 14 or coupling it back to the transmission line 10. The send section 20 of the controller 16 obtains information from the terminal 14 and applies it to the transmission line 10. The transmission line 10 can be a continuous loop or can be a long length of transmission line terminated at some point other than the host CPU. The controller 16 which interfaces the transmission line 10 and the terminal 14 is isolated from the transmission line 10 and the terminal 14 by couplers 22 and 22*a* known as stripline directional couplers which have the capability of coupling signals from one line to another without destroying the original signal. Thus, it should be appreciated that the terminal 14 can have a power failure which will not affect the controller 16 or for that matter the transmission line 10. Similarly, the controller 16 can have a failure which will not destroy the information on the transmission line 10. Since the transmission line signal is essentially electrically isolated from the various terminals the reliability is very high. The couplers 22,22*a* used to isolate the controller 16 can be directional couplers of the stripline variety which consist essentially of two parallel adjacent printed circuit striplines sandwiched between two ground planes which are inductively and capacitively coupled so that the edges of a first pulse, of fast rise and fall time characteristics, propagating along one line, produce a positive pulse and a negative pulse in the other line. The lines are back coupled or directional in that the thus produced pulses propagate along the second line in a direction opposite to the direction in which the first pulse propagates along the first line. The energy transferred between the coupling segments of the two element directional coupler is effected by the various physical characteristics of the directional coupler such as the length, width and distance between the coupling segments.

Figure 2:
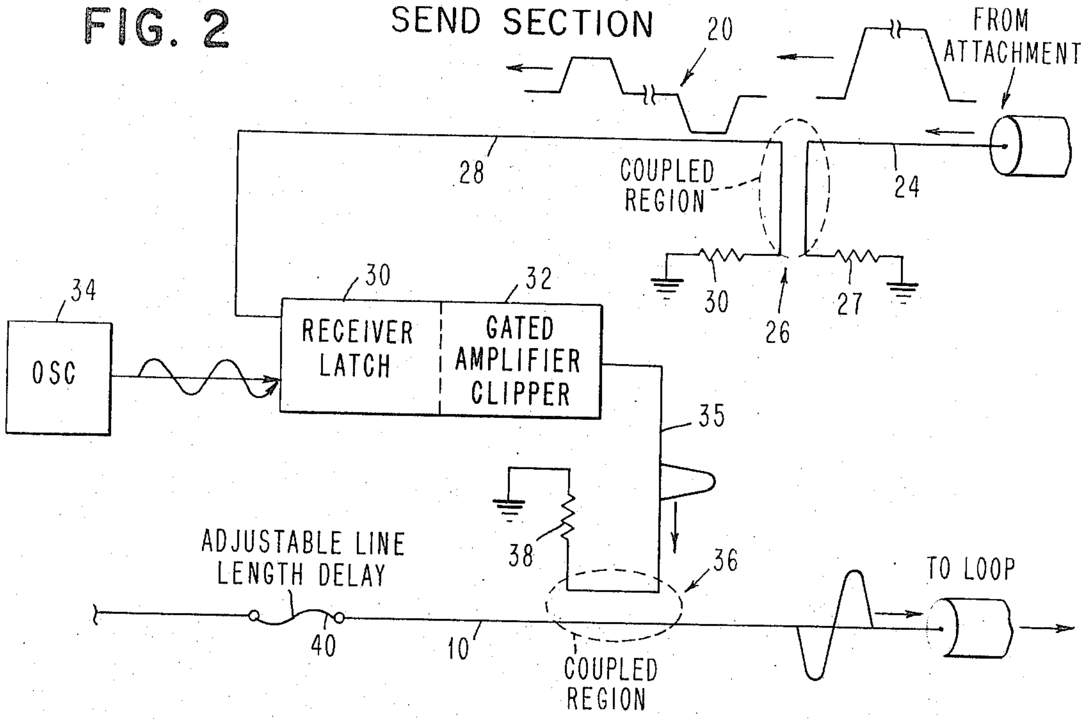
FIG. 2 is a schematic diagram showing the details of the send section of the controller shown in FIG. 1.
Figure 3:
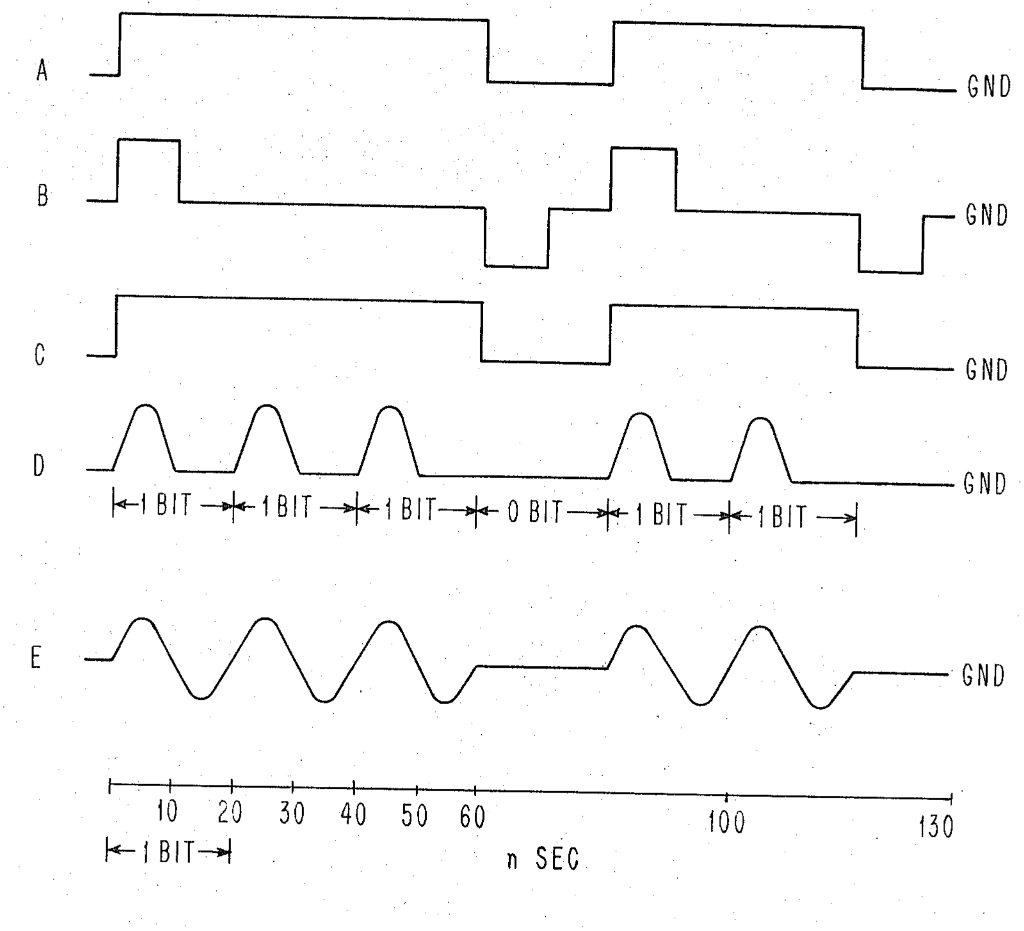
FIG. 3 shows waveforms generated in FIG. 2.

Referring to FIG. 2, there is shown the details of the send section 20 of the controller 16 including the directional couplers for providing the required isolation. The information signals to be applied to the transmission line are received from the input/output attachment 14 via a transmission line 24 into which the first directional coupler 26 is connected. The particular pulse illustrated has a fast rise and fall time. The directional coupler 26 is shown schematically as having two conductive segments extending parallel to one another. The stripline type conductors are mounted on a substrate made of a non-conductive material such as epoxy glass and are arranged between two ground planes which usually consist of sheets of copper arranged over and under the conductors. One conductive segment of the directional coupler is connected to the branch input transmission line 24 from the attachment 14 and the other end of the element has a terminating resistor 27 connected thereto. Similarly, the other conductive element has one end connected to a branch transmission line 28 and the other end connected to a terminating resistor 30. The coupling takes place along the length of the conductive segments. The coupler operation depends upon the steepness of the incident pulse rise and fall time. The width or duration of the pulse produced by the coupling is primarily determined by the length of the two segments in parallel. The performance of the coupler is related to the impedances offered to signals on the transmission lines and the coupling ratio, which are determined by the widths of the lines in the coupled region, the thickness of the lines, the distance between ground planes, and the relative dielectric constant of the material. The coupled pulse travels in an opposite direction in the second conductive segment to the direction of travel in the first conductive segment. A stripline coupler is operated by the edge of the wave passing along one of the lines and this wave edge should have a rise or fall time that is twice as fast as the time duration of the pulse induced in the coupling in order that the relationship of the height of the induced pulse be related to the height of the driving pulse in the manner defined by the coupling ratio. The pulse coupled to the branch transmission line 28 by coupler 26 has a positive and a negative pulse waveform as seen in FIG. 2 and particularly in waveform B of FIG. 3. The positive pulse of waveform B is generated as a result of the rise time of pulse A. Similarly, as the pulse in waveform A has a fast fall time, a negative pulse is generated in waveform B. This waveform consisting of a positive pulse followed by a negative pulse after a certain delay, depending on the length of the generating pulse, is utilized in the send section 20 to control the receiver latch 30. The receiver latch 30 connects oscillator signals to the gated-clipper 32. The oscillator 34 generates sinewave signals as shown in FIG. 2. The receiver latch 30 is turned off by the negative pulse of waveform B obtained from coupler 26. The amplifier-clipper 32 amplifies and clips the negative excursions of the sinewave signals from the oscillator 34 and feeds a transformed signal D (FIGS. 3) via a connecting line 35 to the directional coupler 36. Coupler 36 has one end of a conductive element connected to the line 35 and has the other end terminated by a terminating resistor 38. The other conductive element of tis directional coupler 36 is formed as part of the main transmission line 10. The amplified and transformed waveform output of the amplifier 32 is applied to the first conductive element of the directional coupler 36. This waveform causes a sinusoidal waveform of diminished amplitude on the transmission line 10 as a result of the coupling. It should be noted that the direction of propagation of the signal coupled onto the transmission line 10 is in the direction of travel of the signals along the main transmission line. It will be appreciated, that no synchronization of the pulses with respect to the information on the transmission line is shown. However, if the attachment is in communication with the CPU or source of information to be put on the transmission line or the previous send section of a terminal or controller, the input pulse from the attachment 14 can be adjusted in length to give the proper separation of the positive and negative pulse such that the sinewave oscillations in conjunction with the characteristics of the directional coupler 36 can place the information in a particular unenergized time interval or frame on the transmission line 10. To accomplish the desired results, the phases of the transmission line signals and the new information can be notched by adjusting the main transmission line length and accordingly its delay. This can be easily done by including an adjustable line length delay 40 to provide the required adjustment, if needed.

The receiver section 18 of the controller 16 has the same advantage as the send section, in that, the circuitry is isolated from both the input/output attachment or terminal and the main transmission line 10 through the characteristics of directional couplers. The receiver section 18 is shown in somewhat more detail in FIG. 4 wherein the information signal on the main transmission line 10 is shown as being coupled through a directional coupler 42 to a branch line 44. The first conductive segment 46 of this directional coupler 42 forms a part of the main transmission line 10 while the second conductor element 48 is placed parallel thereto and within coupling distance thereof. One end of the second conductive element 48 is terminated in a terminating resistor 50 while the other end is connected to the branch transmission line 44. As was previously mentioned in connection with the couplers in the send section 20 of the controller 16, the signal from the transmission line 10 is coupled into the second conductive element 48 of the directional coupler 42 but is propagated in the opposite direction. In the case of directional coupler 42, the signal is therefore travelling towards an amplifier driver unit 52 connected in the branch line 44. The signal is transformed and attenuated because of the characteristics of the directional coupler. The signal passed through the coupler is affected by the transfer function associated with the coupler. Accordingly, the signal obtained will not be a true sinusoid but will have a waveform as shown in B of FIG. 5.

Figures 4, 5:
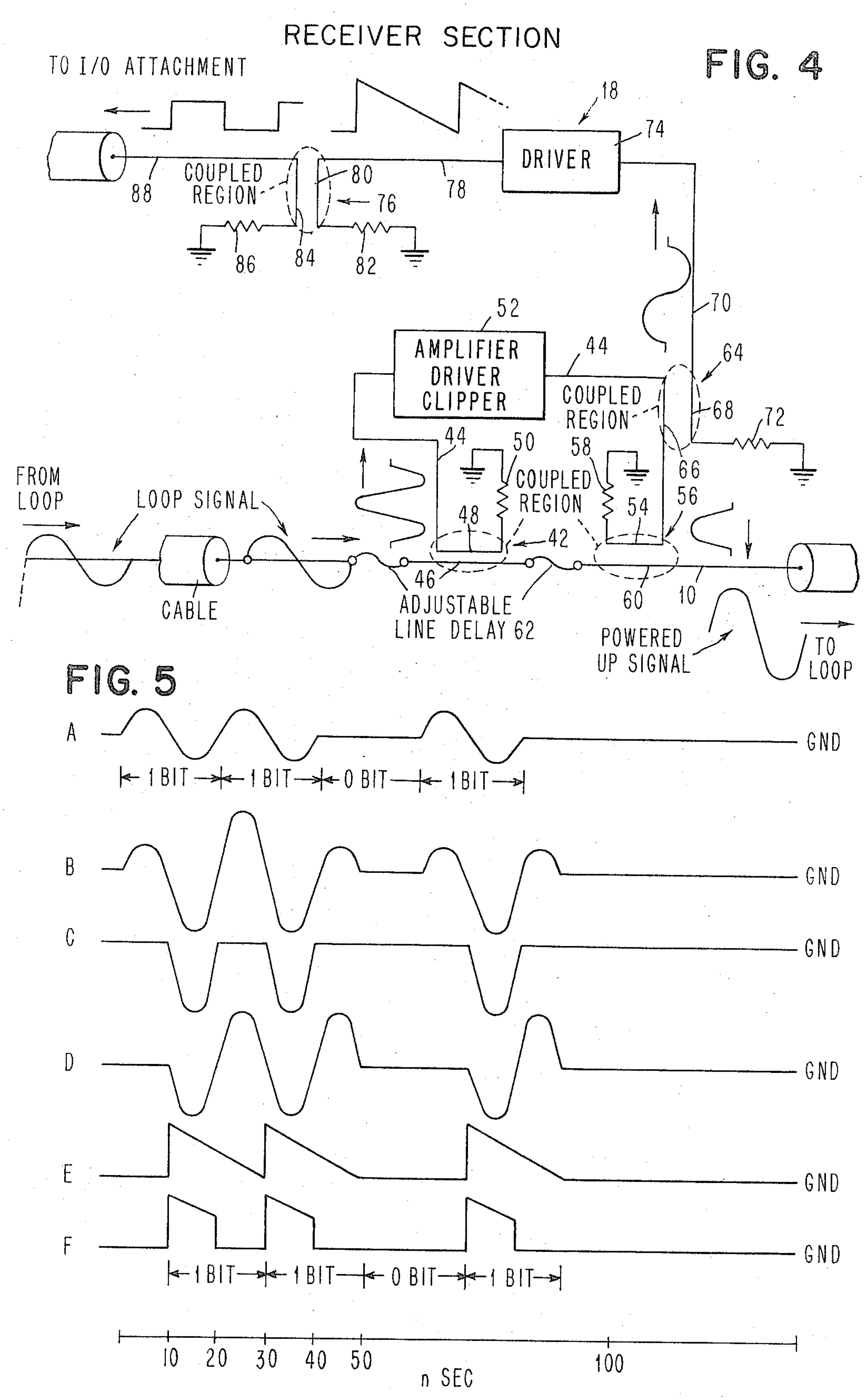
FIG. 4 is a schematic diagram showing the receive section of the controller shown in FIG. 1.
FIG. 5 shows the waveforms generated in FIG. 4.

Referring to FIG. 5, there are shown various waveforms associated with the receiver section 18 of the controller 16. Waveform A represents the sinusoidal waveform arriving at directional coupler 42 on the main transmission line 10. WAveform B is the waveform obtained after coupling waveform A through directional coupler 42. As previously mentioned, the waveform B is somewhat transformed and attenuated depending on the transfer function and coupling ratio of the coupler. The signal in the branch transmission line 44 is applied to the amplifier-driver-clipper 52 where the signal is amplified, transformed and applied to the second portion of the branch transmission line 44. The branch transmission line 44 is connected to one end of an element 54 of a directional coupler 56 whereas the other end of the element 54 has a terminating resistor 58 connected thereto. The other conductive element 60 of this directional coupler forms part of the main transmission line 10. It should be noted that the branch transmission line 44 is connected at the right end and the terminating resistor 58 is connected at the left end of the coupling element 54 which is just the opposite of the directional coupler 42. Thus, the signal applied to directional coupler 56 is travelling in the opposite direction to the signal on the main transmission line 10. Accordingly, the signal coupled onto the main transmission line 10 will be travelling in the direction of propagation of the signals on the line and is superimposed over the signals on the line which gave rise to the coupling action in direction coupler 42. It will be appreciated that the main transmission line signals in being coupled to the branch transmission line 44 where they are amplified are not destroyed on the main transmission line 10 but continue to propagate down the line. If the delay of the transmission line 10 is correctly adjusted, then the amplified signal in the branch transmission line 44 when reapplied to the transmission line 10 via the directional coupler 56 will be superimposed on the correct signals. The transmission line 10 between directional coupler 42 and directional coupler 56 includes an adjustable line dealy 62 by means of which the length of the line between the two directional couplers can be adjusted to obtain the desired delay so that the amplified signal coupled onto the transmission line 10 from the branch line 44 can be synchronized with the signal on the transmission line 10 so as to be superimposed thereon. In other words, the delay between the two directional couplers is adjusted to be exactly the same as the delay introduced by the branch transmission line 44 and amplifier-driver-clipper 52. It should be appreciated, that communication loops of this type have required repeaters in the past, which introduce logic into the transmission line and, thus, provide a physical interruption of the line which makes the transmission line reliability dependent on the circuitry in the repeater. The present arrangement of coupling the amplifier-driver-clipper 52 to the transmission line, as shown, essentially isolates the circuitry of the amplifier from the transmission line 10. For example, if the amplifier 52 should fail, the signal on the transmission line 10 is not affected other than it is not amplified. Since one of these amplifier units 52 is expected to be included in each of the controllers 16 along the transmission line 10, the signal will be amplified at the next controller 16 and, accordingly, the information on the transmission line 10 is in no way affected by the failure.

The amplified signals following the amplifier driver 52 pass through a further directional coupler 64. This directional coupler 64 has one conductive element 66 formed as part of the branch transmission line 44 and has the other conductive element 68 connected in a further branch transnission line 70. One end of the conductive element 68 is connected to the further branch transmission line 70 and the other end is connected to a terminating resistor 72. The signal coupled onto the further branch transmission line 70 is fed to a driver 74 which essentially shapes the signal. The driver 74 changes the sinusoidal signals from the coupler 64 into signals having a sharp rise time and a slow fall time as can be seen from waveform E in FIG. 5. The waveform C depicts the signal following the amplifier-driver-clipper 52 and waveform D shows the waveform after passing through the directional couplers 56 or 64. The signals from the driver 74 are connected to the input/output attachment or terminal through a further directional coupler 76. The output line 78 from the driver 74 is connected to one end of the first conductive element 80 of the directional coupler 76 and the other end is terminated in a terminating resistor 82. The second conductive element 84 is located within coupling distance of the first conductive element 80 and likewise has a terminating resistor 86 at one end and has the other end connected to the line 88 which attaches to the input/output attachment. The signal from the coupler 76 consists essentially of a square pulse for each of the sharp rise times of the signal from the driver 74 which travels towards the input/output attachment. The square pulses generated by the coupler are shown as waveform F in the waveforms of FIG. 5. The directional couplers 42 and 56 isolate the amplifier driver 52, as mentioned previously, and the directional couplers 64 and 76 isolate the driver 74 from the amplifier driver 52 and also from the terminal or input/output attachment. Thus, the units are isolated from each other and any power failure in any unit does not affect the other units.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A multi-terminal digital signal communication apparatus comprising:
- a continuous medium for conveying signals;
- at least one signal sending means for generating and propagating signals along said medium;
- first means coupled to said medium for obtaining branch signals without interrupting the conveyance of said signals along said medium;
- means for amplifying said branch signals; and
- second means coupled to said medium for applying said amplified branch signals to said medium propagating in the direction of conveyance of said signals along said medium and superimposed on said signals.

2. Multi-terminal digital signal communication apparatus according to claim 1, wherein said continuous medium is a transmission line.

3. Multi-terminal digital signal communication apparatus according to claim 2, wherein said first means coupled to said medium for obtaining branch signals without interrupting the conveyance of said signals along said medium comprises a directional coupler arranged with respect to said transmission line to cause transmission line signals to couple to a branch line.

4. Multi-terminal digital signal communication apparatus according to claim 3, wherein said second means is a directional coupler connected to said transmission line so as to cause said amplified branch signals to couple to said transmission line travelling in the direction of signal propagation on said transmission line and superimposed on said signals from which said branch signals were coupled.

5. Multi-terminal digital signal communication apparatus according to claim 2, wherein said transmission line includes means for adjusting the line length between said first and second means so that the transmission line delay can be made equivalent to the branch signal delay so that said signal coupled to the transmission line can be superimposed on said signal propagating along said transmission line.

6. Multi-terminal digital signal communication apparatus according to claim 2, wherein a further coupling means is provided for coupling an output signal onto an output line in response to said amplified branch signal.

7. Multi-terminal digital signal communication apparatus according to claim 6, wherein signal shaping means are provided in said output line for shaping pulses for use in the terminal.

8. Multi-terminal digital signal communication apparatus according to claim 7, wherein said signal shaping means comprises a driver circuit for producing pulses having a sharp rise time and a slow decay time and a directional coupler for coupling square wave pulses to a terminal line in response to said sharp rise time pulses.

9. Multi-terminal digital signal communication apparatus according to claim 2, wherein said signal sending means includes a sending directional coupler for coupling said signal onto said transmission line in response to sending signals generated in said signal sending means.

10. Multi-terminal digital signal communication apparatus according to claim 9, wherein said signal sending means includes an input directional coupler and a gated oscillator, said input directional coupler coupling a positive and negative pulse to said gated oscillator turning said oscillator on and off, respectively, thereby generating said sending signals.

11. Apparatus according to claim 1, wherein said first means, said means for amplifying said branch signals and said second means are located at predetermined locations along said transmission medium to provide the needed signal amplification.

* * * * *